US012776495B2

(12) United States Patent
Uchiyama et al.

(10) Patent No.: US 12,776,495 B2

(45) Date of Patent: Oct. 27, 2026

(54) NON-AQUEOUS ELECTROLYTE SECONDARY BATTERY

(71) Applicant: Panasonic Intellectual Property Management Co., Ltd., Osaka (JP)

(72) Inventors: Yohei Uchiyama, Hyogo Ken (JP); Takahiro Fukuoka, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 626 days.

(21) Appl. No.: 18/268,426

(22) PCT Filed: Dec. 17, 2021

(86) PCT No.: PCT/JP2021/046732

§ 371 (c)(1),
(2) Date: Jun. 20, 2023

(87) PCT Pub. No.: WO2022/138488

PCT Pub. Date: Jun. 30, 2022

(65) Prior Publication Data

US 2023/0395810 A1 Dec. 7, 2023

(30) Foreign Application Priority Data

Dec. 24, 2020 (JP) ................................ 2020-214909

(51) Int. Cl.
*H01M 4/70* (2006.01)
*H01M 4/13* (2010.01)
(Continued)

(52) U.S. Cl.
CPC ............... *H01M 4/70* (2013.01); *H01M 4/13* (2013.01); *H01M 10/0525* (2013.01);
(Continued)

(58) Field of Classification Search
CPC ............. H01M 4/70; H01M 4/13; H01M 4/10
See application file for complete search history.

(56) References Cited

U.S. PATENT DOCUMENTS 6,444,357 B1 9/2002 Kambe et al.
6,664,005 B2 12/2003 Kezuka et al.
(Continued)

FOREIGN PATENT DOCUMENTS

CN 1274955 A 11/2000
JP 2001-266894 A 9/2001
(Continued)

OTHER PUBLICATIONS

Office Action dated Aug. 19, 2025, issued in counterpart JP Application No. 2022-571403.(18 pages).
(Continued)

*Primary Examiner* — Kenneth J Douyette
(74) *Attorney, Agent, or Firm* — WHDA, LLP

(57) ABSTRACT

A non-aqueous electrolyte secondary battery includes an electrode group, and a non-aqueous electrolyte. The electrode group includes a positive electrode, a negative electrode, and a separator interposed between the positive electrode and the negative electrode. The negative electrode includes a negative electrode current collector having a belt-like shape and having a first end and a second end in a short-side direction of the negative electrode current collector. The negative electrode current collector includes at least one slit group constituted of a plurality of slits extending in a form of a dashed line along the short-side direction from one end of the first end and the second end toward the other end, and a hole formed on the other end side of the plurality of slits and having a width larger than an average width of the plurality of slits.

15 Claims, 2 Drawing Sheets

(51) Int. Cl.
*H01M 10/0525* (2010.01)
*H01M 10/0587* (2010.01)
*H01M 4/02* (2006.01)

(52) U.S. Cl.
CPC .. *H01M 10/0587* (2013.01); *H01M 2004/021* (2013.01); *H01M 2004/027* (2013.01)

(56) References Cited

U.S. PATENT DOCUMENTS

| | | | | |
|---|---|---|---|---|
| 2008/0073998 | A1 | 3/2008 | Sugiura et al. | |
| 2008/0089006 | A1* | 4/2008 | Zhong | H01M 4/583 29/874 |
| 2008/0153000 | A1 | 6/2008 | Salot et al. | |
| 2014/0106217 | A1 | 4/2014 | Lee et al. | |
| 2016/0226055 | A1 | 8/2016 | Miyake | |
| 2017/0025682 | A1 | 1/2017 | Ji et al. | |
| 2019/0372171 | A1 | 12/2019 | Kano et al. | |

FOREIGN PATENT DOCUMENTS

| | | | |
|---|---|---|---|
| JP | 2005-085570 | A | 3/2005 |
| JP | 2005-100899 | A | 4/2005 |
| JP | 2008-085462 | A | 4/2008 |
| JP | 2010-009838 | A | 1/2010 |
| JP | 2013-218804 | A | 10/2013 |
| JP | 2016-146340 | A | 8/2016 |
| JP | 2019-212601 | A | 12/2019 |

OTHER PUBLICATIONS

International Search Report dated Feb. 15, 2022, issued in counterpart International Application No. PCT/JP2021/046732, with English translation. (5 pages).
Written Opinion dated Feb. 15, 2022, issued in counterpart International Application No. PCT/JP2021/046732. (4 pages).
Hearing Notice dated Mar. 28, 2025, issued in counterpart IN Application No. 202347038970 (3 pages).
Office Action dated Feb. 3, 2026, issued in counterpart JP Application No. 2022-571403. (4 pages).
Office Action dated May 26, 2026, issued in counterpart CN Application No. 202180086231.7, with English translation. (10 pages).

* cited by examiner

NON-AQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2021/046732 filed on Dec. 17, 2021, which claims the benefit of priorities under 35 U.S.C. § 119(a) of Japanese Patent Application No. 2020-214909 filed in Japan on Dec. 24, 2020, the contents of which are incorporated herein by reference.

TECHNICAL FIELD

The present disclosure relates to a non-aqueous electrolyte secondary battery.

BACKGROUND ART

Non-aqueous electrolyte secondary batteries are used for ICT devices, such as personal computers and smart phones, automobiles, power storage systems, and other applications. Various modifications have been attempted for improving the characteristics of the non-aqueous electrolyte secondary batteries. For example, a modification to the shape of the current collector also has been proposed.

Patent Literature 1 proposes, in an electrode of a non-aqueous electrolyte battery, to provide a cut in the metal current collector, so that the metal current collector can be bent freely.

CITATION LIST

Patent Literature

Patent Literature 1: Japanese Laid-Open Patent Publication No. 2001-266894

SUMMARY OF INVENTION

Technical Problem

In a non-aqueous electrolyte secondary battery, expansion and contraction of the negative electrode associated with charge and discharge are severe. When the negative electrode expands during charge, the negative electrode current collector may fail to follow the expansion, causing a rupture, and the electrical connection may break in some cases. When the electrical connection in the negative electrode current collector breaks, the cycle characteristics of the non-aqueous electrolyte secondary battery will deteriorate.

Solution to Problem

One aspect of the present disclosure relates to a non-aqueous electrolyte secondary battery, including:

an electrode group; and a non-aqueous electrolyte, wherein the electrode group includes a positive electrode, a negative electrode, and a separator interposed between the positive electrode and the negative electrode, the negative electrode includes a negative electrode current collector having a belt-like shape and having a first end and a second end in a short-side direction of the negative electrode current collector, and the negative electrode current collector includes at least one slit group constituted of a plurality of slits extending in a form of a dashed line along the short-side direction from one end of the first end and the second end toward the other end, and a hole formed on the other end side of the plurality of slits and having a width larger than an average width of the plurality of slits.

Advantageous Effects of Invention

The cycle characteristics of a non-aqueous electrolyte secondary battery can be improved.

DESCRIPTION OF EMBODIMENTS

Figure 1:
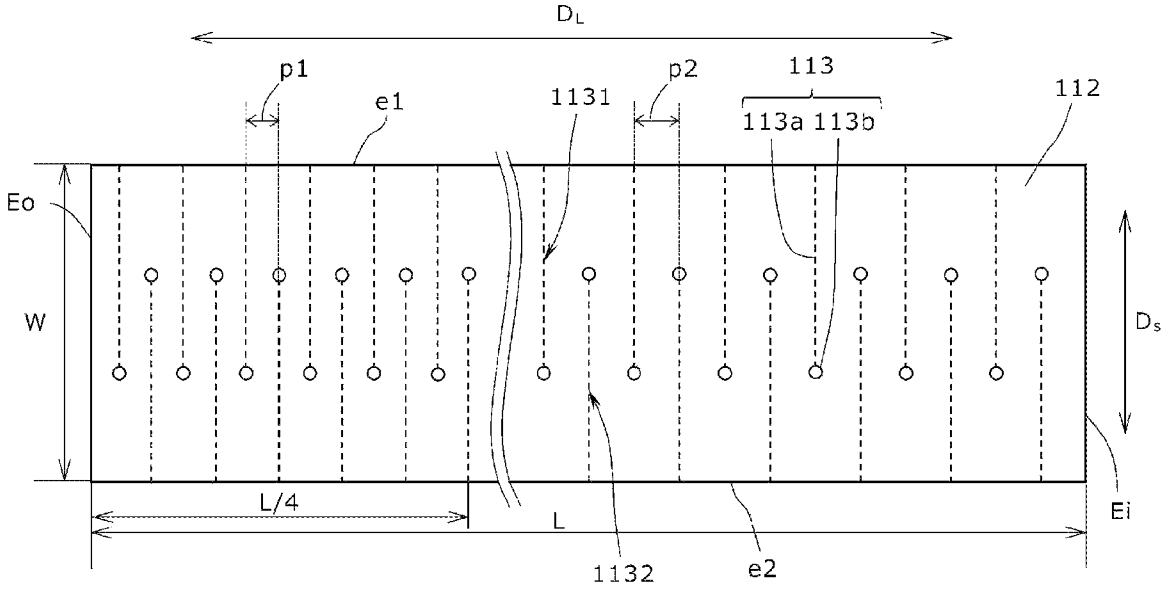
FIG. 1 A plan view of an example of a negative electrode current collector according to one embodiment of the present disclosure.

While the novel features of the invention are set forth particularly in the appended claims, the invention, both as to organization and content, will be better understood and appreciated, along with other objects and features thereof, from the following detailed description taken in conjunction with the drawings.

A non-aqueous electrolyte secondary battery of the present disclosure includes an electrode group, and a non-aqueous electrolyte. The electrode group includes a positive electrode, a negative electrode, and a separator interposed between the positive electrode and the negative electrode. The negative electrode includes a negative electrode current collector having a belt-like shape and having a first end and a second end in a short-side direction of the negative electrode current collector. The negative electrode current collector includes at least one slit group constituted of a plurality of slits extending in the form of a dashed line along the short-side direction from one end of the first end and the second end toward the other end, and a hole formed on the other end side of the plurality of slits and having a width larger than an average width of the plurality of slits.

In the above non-aqueous electrolyte secondary battery, when a stress due to the expansion of the negative electrode during charge is applied to the negative electrode current collector, the negative electrode current collector ruptures along the plurality of slits in the form of a dashed line. The stress is relaxed by the hole which is formed on the other end side of the plurality of slits and having a width larger than the average width of the slits, and the rupture of the negative electrode current collector stops at the portion of the hole. Therefore, on the above one end side, the negative electrode current collector may rupture, but on the above other end side, the negative electrode current collector is unlikely to rupture. In other words, by providing the aforementioned slit group in the negative electrode current collector, it is possible to control the position at which the negative electrode current collector ruptures, when a stress due to the expansion of the negative electrode is applied to the negative electrode current collector. Therefore, the negative electrode current collector is prevented from being completely cut along the short-side direction, and the electrical connection of the negative electrode current collector is maintained. As a result, the cycle characteristics can be improved.

In the following, the negative electrode will be more specifically described.

(Negative Electrode)

In one slit group, the plurality of slits are arranged at intervals along the short-side direction of the negative electrode current collector. In one slit group, each slit is formed so as to extend along the short-side direction of the negative electrode current collector. The width of the slits is a value obtained, with respect to the slit group, by averaging the maximum slit sizes in the long-side direction of the negative electrode current collector of respective slits. The width of the hole is a maximum hole size in the long-side direction of the negative electrode current collector.

Of the first and second ends of the negative electrode current collector, one end may be cut by the slit on the one end side of the plurality of slits. This weakens the strength at one end of the negative electrode current collector, and when a stress is applied to the negative electrode current collector, the rupture can proceed smoothly along the plurality of slits. Therefore, it becomes easy to control the position at which the negative electrode current collector ruptures.

Here, the slit on the one end side is a slit located closest to one end in the short-side direction of the negative electrode current collector, among the plurality of slits constituting one slit group. The slit on the other end side is a slit located closest to the other end in the short-side direction of the negative electrode current collector, among the plurality of slits constituting one slit group.

The negative electrode current collector has at least one slit group, and may have a plurality of slit groups. When the negative electrode current collector has a plurality of slit groups, the plurality of slit groups may be formed such that all the slit groups extend from one end (e.g., first end) toward the other end (e.g., second end) of the negative electrode current collector (in other words, in the same direction).

When the negative electrode current collector has a plurality of slit groups, some of the slit groups and the remaining slit groups may be formed in different directions. More specifically, the plurality of slit groups may include: a first slit group constituted of a plurality of first slits extending along the short-side direction from the first end toward the second end of the negative electrode current collector, and a first hole formed on the second end side of the plurality of first slits; and a second slit group constituted of a plurality of second slits extending along the short-side direction from the second end toward the first end, and a second hole formed on the first end side of the plurality of second slits. In this case, the stress applied to the negative electrode current collector associated with expansion of the negative electrode can be more easily dispersed, and the effect of suppressing the rupture at the position other than the slit groups can be enhanced, and therefore, the electrical connection can be more easily maintained when a rupture of the negative electrode current collector occurs.

The first slit group and the second slit group are preferably alternately arranged. In this case, it is further easy to control the position at which the negative electrode current collector ruptures, and the electrical connection can be more easily maintained when a rupture of the negative electrode current collector occurs. An example of a negative electrode current collector in which the first slit group and the second slit group are alternately arranged is shown in FIG. 1.

FIG. 1 is a plan view of an example of a negative electrode current collector used in a non-aqueous electrolyte secondary battery according to one embodiment of the present disclosure. In FIG. 1, a negative electrode current collector 112 having a belt-like shape has a plurality of slit groups 113. Each slit group 113 is constituted of a plurality of slits 113*a* extending in the form of a dashed line along a short-side direction $D_s$ of the negative electrode current collector 112 from one end toward the other end in the short-side direction $D_s$, and a hole 113*b* having a circular shape. In each slit group 113, the hole 113*b* is formed on the other end side of the plurality of slits 113*a*. More specifically, the hole 113*b* is continuous with the slit on the other end side of the plurality of slits 113*a*. Also, in each slit group 113, the width of the hole 113*b* is larger than the average width of the plurality of slits 113*a*. In FIG. 1, the negative electrode current collector 112 has a plurality of slit groups 113. The plurality of slit groups 113 are formed at intervals along a long-side direction $D_L$ of the negative electrode current collector 112. In FIG. 1, the plurality of slit groups 113 are constituted of a plurality of first slit groups 1131 extending along the short-side direction $D_S$ from a first end e1 toward a second end e2 in the short-side direction $D_S$ of the negative electrode current collector 112, and a plurality of second slit groups 1132 extending along the short-side direction $D_S$ from the second end e2 toward the first end e1. The first slit group 1131 and the second slit group 1132 are alternately arranged. Note that the description below is not limited to the description of the example of FIG. 1.

In one slit group, the direction in which the plurality of slits forming this slit group extend in the form of a dashed line may be in parallel with or cross the short-side direction of the negative electrode current collector. The acute angle formed by the direction in which the plurality of slits extend in the form of a dashed line and the short-side direction of the negative electrode current collector is, for example, 30° or less, and may be 15° or less. Here, the direction in which the plurality of slits extend in the form of a dashed line is an average direction of the longitudinal directions of respective slits constituting one slit group.

The average interval between adjacent slits in the direction extending in the form of a dashed line is, for example, 0.02 mm or more, preferably 0.1 mm or more, and may be 0.2 mm or more. When the average interval between adjacent slits is within the range as above, it is possible to suppress the occurrence of a rupture of the negative electrode current collector in the production process of a negative electrode or the production process of an electrode group. The average interval between adjacent slits in the direction extending in the form of dashed line is, for example, 3 mm or less, preferably 2.5 mm or less, more preferably 1.5 mm or less or 1 mm or less. In this case, it is further easy to control the position at which the negative electrode current collector ruptures due to the expansion of the negative electrode, and excellent current collecting performance of the negative electrode current collector after rupture can be more easily ensured. These lower and upper limits can be combined in any combination. The interval between adjacent slits in the direction extending in the form of a dashed line is a separation distance between the slits adjacent to each other (in other words, the distance between the ends facing each other of adjacent slits).

The length of the slits is, for example, 0.1 mm or more and 7 mm or less, may be 0.5 mm or more and 3 mm or less, and may be 0.5 mm or more and 1 mm or less. When the length of the slits is within the range as above, it is further easy to control the position at which the negative electrode current collector raptures due to the expansion of the negative electrode. The length of the slits is a value obtained, with respect to the slit group, by averaging the lengths of respective slits in the direction extending in the form of a dashed line. The length of the slits is larger than the width of the slits.

The width of the slits is, for example, 0.005 mm or more and 0.1 mm or less, may be 0.01 mm or more and 0.05 mm or less, and may be 0.02 mm or more and 0.04 mm or less. When the width of the slits is within the range as above, the negative electrode current collector can be allowed to rupture more smoothly along the plurality of slits arranged in the form of a dashed line.

The hole is formed, in the slit group, on the other end side of the plurality of slits. The hole, as shown in FIG. 1, may be continuous with the slit on the other end side of the plurality of slits. Alternatively, the hole may be formed with a space from the slit on the other end side. In the latter case, the hole is formed in the vicinity of the slit on the other end side, so that the plurality of slits and the hole constitute one slit group. The space between the hole and the slit on the other end side is, for example, 3 mm or less, preferably 2.5 mm or less, more preferably 1.5 mm or less, or 1 mm or less. In view of further enhancing the effect of preventing the negative electrode current collector from rupturing at an unintended position when the negative electrode expands, the hole is preferably continuous with the slit on the other end side. The space between the hole and the slit on the other end side is a separation distance between the hole and the slit on the other end side.

The width of the hole is, for example, 0.05 mm or more, and may be 0.1 mm or more or 0.2 mm or more. In this case, the effect of relaxing the stress applied to the negative electrode current collector associated with expansion of the negative electrode is enhanced, and the effect of preventing the negative electrode current collector from rupturing at an unintended position can be further enhanced. In view of ensuring more excellent current collecting performance, the width of the hole is preferably 2 mm or less, more preferably 1.5 mm or less, or 1 mm or less. These lower and upper limits can be combined in any combination. The length of the hole in the short-side direction of the negative electrode current collector can be selected from the range described for the width of the hole. The length of the hole is a maximum hole size in the short-side direction of the negative electrode current collector.

The negative electrode current collector has a pair of principal surfaces that occupy most of the entire surface of the belt-like negative electrode current collector. A shape of the hole when one principal surface is viewed from the direction perpendicular to the principal surface of the negative electrode current collector may be, for example, polygonal (e.g., square, pentagon, hexagon), but is preferably circular or oval. When the shape of the hole is circular or oval, the effect of relaxing the stress applied to the negative electrode current collector associated with expansion of the negative electrode is enhanced, and the effect of preventing the negative electrode current collector from rupturing, starting from the hole, at an unintended position can be enhanced.

When the length in the short-side direction of the negative electrode current collector (in other words, the width of the negative electrode current collector) is denoted by W, the distance between the hole and the other end of the negative electrode current collector is preferably 0.1 W or more. 0.5 W or less, more preferably 0.15 W or more and 0.4 W or less, further more preferably 0.15 W or more and 0.35 W or less. When the distance between the hole and the other end of the negative electrode current collector is within the range as above, this enhances the effect of preventing the negative electrode current collector from being cut completely, while relaxing the stress associated with expansion of the negative electrode. The distance between the hole and the other end of the negative electrode current collector is a shortest distance between the hole measured at a point closest to the other end of the negative electrode current collector, and the other end.

When the negative electrode current collector has a plurality of slit groups, the plurality of slit groups may be formed at intervals along the long-side direction of the negative electrode current collector. The average interval between adjacent slit groups is greater than the width of the hole. The average interval between adjacent slit groups is, for example, 0.2 mm or more, preferably 0.5 mm or more, and may be 1.5 mm or more or 2 mm or more. When the average interval between adjacent slit groups is within the range as above, even though s stress associated with expansion of the negative electrode is applied to the negative electrode current collector, the plurality of slits are allowed to readily rupture smoothly in the direction in which the plurality of slits extend in the form of a dashed line. The upper limit of the average interval between adjacent slit groups is not particularly limited. In view of further easily controlling the position at which the negative electrode current collector ruptures when the negative electrode expands, the average interval between adjacent slit groups is preferably 10 mm or less, and may be 5 mm or less. These lower and upper limits can be combined in any combination.

In the electrode group, the intervals between adjacent slit groups may be the same. Preferably, in the electrode group, in a portion apt to be subjected to a stress associated with expansion of the negative electrode, the intervals between the adjacent slit groups are set smaller than those in the other portion. This can more effectively relax the stress associated with expansion of the negative electrode. Therefore, the effect of preventing the negative electrode current collector from rupturing at an unintended position can be further enhanced. For example, in the vicinity of a current collecting tab or lead connected to the negative electrode, it is preferable to set the intervals between adjacent slit groups smaller than those in a portion away from the tab or lead.

When the electrode group is a wound electrode group in which a positive electrode, a negative electrode, and a separator are wound together, the stress associated with expansion of the negative electrode is difficult to be relaxed in the inside of the wound electrode group, and is directed to the outside. Therefore, it is preferable to set the intervals between adjacent slit groups in a portion on the outer layer side of the negative electrode current collector to be smaller than those in the remaining portion. More specifically, when the length in the long-side direction of the negative electrode current collector is denoted by L, the average interval between adjacent slit groups in a portion of L/4 from an end on the outer layer side of the negative electrode current collector is preferably smaller than that in the remaining portion. FIG. 1 illustrates an example in which the intervals between adjacent slit groups 113 in a portion of L/4 from an end Eo on the outer layer side of the negative electrode current collector 112 are smaller than the intervals between adjacent slit groups 113 in the remaining portion (specifically, in a portion of 3L/4 from an end Ei on the inner layer side of the negative electrode current collector 112).

When the average interval between adjacent slit groups in a portion of L/4 from the end on the outer layer side of the negative electrode current collector is denoted by Po, and the average interval between adjacent slit groups in the remaining portion is denoted by Pi, a ratio Po/Pi is, for example, $0<Po/Pi<1$, preferably $0.1\leq Po/Pi\leq 0.7$, more preferably $0.2\leq Po/Pi\leq 0.5$. For example, in FIG. 1, the average interval between adjacent slit groups 113 in a portion of L/4 from the end Eo on the outer layer side of the negative electrode current collector 112 can be determined by averaging the sum of intervals p1 between adjacent slit groups 113. With respect to the remaining portion, too, the average interval between adjacent slit groups can be determined by averaging the sum of intervals p2 between adjacent slit groups.

Here, the interval between adjacent slit groups means, when in adjacent slit groups, two straight lines are drawn, from the first end to the second end, in the directions in which the plurality of slits constituting respective slit groups extend in the form of a dashed line, a distance measured at the first end between the two straight lines.

As the material of the negative electrode current collector, for example, a metal material, such as a metal and an alloy, can be used. Examples of the metal material include copper (Cu), nickel (Ni), iron (Fe), and an alloy containing these metal elements. Examples of the alloy include a copper alloy and stainless steel (SUS). In particular, copper and a copper alloy having high electrical conductivity are preferred.

The negative electrode current collector can be obtained by forming a group of slits in a sheet (e.g., foil) of the above material using a known technique for forming slits and holes. Examples of the technique for forming slits and holes include laser machining, etching, press working, cutting, and stamping.

The thickness of the negative electrode current collector is, for example, 5 μm or more and 300 μm or less.

The negative electrode contains a negative electrode active material. The negative electrode may include a negative electrode current collector and a negative electrode active material layer. The negative electrode active material layer may contain, in addition to the negative electrode active material, at least one selected from the group consisting of a binder, a conductive material, a thickener, and an additive, as needed. The negative electrode active material layer may be formed only on one principal surface of the negative electrode current collector, or may be formed on both principal surfaces.

In the non-aqueous electrolyte secondary battery of the present disclosure, since a negative electrode current collector having the above slit groups is used, even when using a negative electrode active material that undergoes severe changes in volume due to expansion during charge, the negative electrode collector is unlikely to be cut completely when the negative electrode expands, and excellent cycle characteristics can be achieved. The negative electrode containing a negative electrode active material as above becomes considerably thicker at full charge than that after initial discharge. The thickness of the negative electrode at full charge is preferably 1.18 times or more, more preferably 1.3 times or more, and may be 2 times or more as large as the thickness of the negative electrode after initial discharge. For example, in a lithium ion secondary battery using graphite as the negative electrode active material, even when a graphite-containing negative electrode active material layer is formed on both principal surfaces of the negative electrode current collector, the thickness of the negative electrode at full charge is merely about 1.1 times as large as the thickness of the negative electrode after initial discharge. Therefore, the non-aqueous electrolyte secondary battery of the present disclosure is particularly effective when using a negative electrode active material whose changes in volume are greater than graphite.

The above thickness of the negative electrode can be determined by photographing an image of a cross section of the electrode group, measuring the thickness of the negative electrode at a plurality of points (e.g., 10 points) in the image, and averaging the measured values. Note that the thickness of the negative electrode is measured at a plurality of points randomly selected in the region where, at least in a charged state, the negative electrode active material is present on both principal surfaces of the negative electrode current collector.

The thickness of the negative electrode at full charge is a thickness of the negative electrode in a non-aqueous electrolyte secondary battery in a fully charged state. The non-aqueous electrolyte secondary battery in a fully charged state refers to a battery having been charged to a state of charge (SOC) of 0.98 C or higher, where C is the rated capacity of the battery. The thickness of the negative electrode after initial discharge is a thickness of the negative electrode in a non-aqueous electrolyte secondary battery having been discharged to a fully discharged state in the initial discharge. The non-aqueous electrolyte secondary battery having been discharged to a fully discharged state in the initial discharge refers to a battery which has been subjected to preliminarily charge and discharge after its fabrication, and then to an initial charge, followed by an initial discharge until the SOC drops to 0.05 C or less. The non-aqueous electrolyte secondary battery having been discharged to a fully discharged state in the initial discharge may be, for example, a non-aqueous electrolyte secondary battery obtained by subjecting a battery commercially available in a charged state to an initial discharge until the SOC drops to 0.05 C or less. The non-aqueous electrolyte secondary battery having been discharged to a fully discharged state in the initial discharge may be, for example, a battery having been subjected to an initial discharge at a constant current of 0.05 C to a lower limit voltage.

The negative electrode active material is selected depending on the type of the non-aqueous electrolyte secondary battery. For example, in the non-aqueous electrolyte secondary battery, when ions to serve as charge carriers are lithium ions, metal lithium, a lithium alloy, and a material capable of electrochemically absorbing and releasing lithium ions can be used as the negative electrode active material. Examples of the lithium alloy include a lithium-aluminum alloy and a lithium-magnesium alloy. Examples of the material capable of electrochemically absorbing and releasing lithium ions include a carbonaceous material and a material containing at least one selected from the group consisting of Si and Sn. The negative electrode may contain the negative electrode active material singly, or in combination of two or more kinds.

Examples of the carbonaceous material include graphite, soft carbon, hard carbon, and amorphous carbon. Examples of the graphite include natural graphite, artificial graphite, and graphitized mesophase carbon particles. Graphite is a carbonaceous material with a developed graphite-type crystal structure. The interplanar spacing d002 of the (002) plane of graphite measured by X-ray diffractometry may be, for example, 0.340 nm or less, and may be 0.3354 nm or more and 0.340 nm or less.

Examples of the Si-containing material include simple Si, a silicon alloy, and a silicon compound (e.g., silicon oxide, silicate, silicon nitride). The silicon oxide is exemplified by $SiO_x$ particles. Here, x satisfies, for example, $0.5\leq x<2$, and may satisfy $0.8\leq x\leq 1.6$. As the Si-containing material, a material containing a lithium silicate phase and silicon particles dispersed in the lithium silicate phase may be used.

Examples of the Sn-containing material include simple Sn, a tin alloy, and a tin compound (e.g., tin oxide, tin nitride). A negative electrode containing a Si-containing material or a Sn-containing material undergoes severe changes in volume due to expansion during charge. In the non-aqueous electrolyte secondary battery of the present disclosure, since a negative electrode current collector having the above slit groups is used, even when using a Si-containing material or a Sn-containing material, excellent cycle characteristics can be achieved. The negative electrode may contain, as a negative electrode active material, at least one selected from the group consisting of a Si-containing material and a Sn-containing material, and a carbonaceous material.

The non-aqueous electrolyte secondary battery of the present disclosure is especially useful as a lithium secondary battery. The lithium secondary battery is also called a lithium metal secondary battery. The negative electrode active material in the lithium secondary battery is a lithium metal. In the lithium secondary battery, a lithium metal deposits on the surface of the negative electrode current collector during charge, and the lithium metal dissolves during discharge. Therefore, the negative electrode undergoes severe changes in volume during charge and discharge. Moreover, in the lithium secondary battery, the lithium metal may deposit in the form of dendrites on the negative electrode during charge. When the lithium metal deposits in the form of dendrites, the amount of expansion of the negative electrode is further increased. The lithium metal deposited in the form of dendrites is harder and bulkier than a lithium metal available commercially or otherwise. Therefore, when the lithium metal deposits in the form of dendrites, a large stress will be applied to the negative electrode current collector. Even in a lithium secondary battery in which the negative electrode current collector tends to be subjected to a large stress during charge, by using the negative electrode current collector having the aforementioned slit groups, the position at which the negative electrode current collector ruptures can be controlled. In this way, the electrical connection of the negative electrode current collector can be maintained, and this can ensure excellent cycle characteristics.

In the lithium secondary battery, for example, 70% or more of the rated capacity is developed by the deposition and dissolution of lithium metal. The electron migration at the negative electrode during charge and during discharge is mainly due to the deposition and dissolution of lithium metal at the negative electrode. Specifically, 70 to 100% (e.g., 80 to 100% or 90 to 100%) of the electron migration (in other words, current flow) at the negative electrode during charge and during discharge is due to the deposition and dissolution of lithium metal. That is, the negative electrode in the lithium secondary battery differs from a negative electrode in which the electron migration at the negative electrode during charge and during discharge is mainly due to the absorption and release of lithium ions into or from the negative electrode active material (e.g., graphite).

In a battery like a lithium secondary battery, in which a lithium metal deposits on the negative electrode during charge, the open circuit potential (OCV: Open Circuit Voltage) of the negative electrode at full charge is, for example, 70 mV or less, relative to lithium metal. The OCV of the negative electrode at full charge is measured by disassembling a fully charged battery in an argon atmosphere, to take out the negative electrode therefrom, and assembling a cell with lithium metal used as a counter electrode. The non-aqueous electrolyte of the cell may be of the same composition as that of the non-aqueous electrolyte in the disassembled battery.

As the binder to be contained in the negative electrode active material layer, for example, a fluorocarbon resin, a polyacrylonitrile, a polyimide resin, an acrylic resin, a polyolefin resin, and a rubbery polymer can be used. Examples of the fluorocarbon resin include polytetrafluoroethylene and polyvinylidene fluoride.

As the conductive material to be contained in the negative electrode active material layer, for example, a conductive carbonaceous material can be used. Examples of the conductive carbonaceous material include carbon black and carbon nanotubes. Examples of the carbon black include acetylene black and Ketjen black.

The negative electrode may be formed by depositing a negative electrode active material on the surface of a negative electrode current collector using a gas phase method, such as electrodeposition or vapor deposition. The negative electrode may be formed by applying a negative electrode slurry containing constituent components of the negative electrode active material layer and a dispersion medium onto a principal surface of the negative electrode current collector, and drying and compressing the applied film. As the dispersion medium, at least one selected from the group consisting of water and an organic medium can be used. In the lithium secondary battery, a negative electrode current collector may be used for fabrication of an electrode group. More specifically, in the lithium secondary battery, for example, an electrode group is fabricated by stacking a negative electrode current collector and a positive electrode with a separator interposed therebetween. In such a lithium secondary battery, lithium ions migrate from the positive electrode during charge and deposit on the surface of the negative electrode current collector.

In the following, a configuration of the non-aqueous electrolyte secondary battery other than the negative electrode will be described.

(Positive Electrode)

The positive electrode includes, for example, a positive electrode current collector having a belt-like shape, and a positive electrode mixture layer formed on a surface of the positive electrode current collector. The positive electrode current collector may be sheet-like (e.g., foil, film), and may be porous. The sheet-like positive electrode current collector may have, as needed, slit groups as described for the negative electrode current collector. For the slit groups, the description for the negative electrode current collector can be referred to. The positive electrode mixture layer may be formed on a pair of principal surfaces of the sheet-like positive electrode current collector, or may be formed on one principal surface. Alternatively, the positive electrode mixture layer may be formed in a packed state in a mesh-like positive electrode current collector.

As the material of the positive electrode current collector, for example, a metal material including Al, Ti, Fe, and the like can be used. The metal material may be Al, an Al alloy, Ti, a Ti alloy, an Fe alloy, and the like. The Fe alloy may be stainless steel.

The positive electrode mixture layer contains a positive electrode active material. The positive electrode mixture layer may contain, in addition to the positive electrode active material, at least one selected from the group consisting of a binder, a conductive material, and an additive. Between the positive electrode current collector and the positive electrode mixture layer, a conductive carbonaceous material may be disposed, as needed. As the binder, for example, at least one selected from the binders exemplified for the negative electrode active material layer can be used. As the conductive material, for example, at least one selected from the group consisting of the conductive materials exemplified for the negative electrode active material layer and graphite can be used. As the conductive carbonaceous material, for example, at least one selected from the conductive carbonaceous materials exemplified as the conductive material for the negative electrode active material layer can be used.

The positive electrode active material is selected depending on the type of the non-aqueous electrolyte secondary battery. For example, in the non-aqueous electrolyte secondary battery, when ions to serve as charge carriers are lithium ions, a material that electrochemically absorbs and releases lithium ions can be used as the positive electrode active material. Such a material may be at least one selected from the group consisting of a lithium-containing transition metal oxide, a transition metal fluoride, a polyanion, a fluorinated polyanion, and a transition metal sulfide. The positive electrode active material may be a lithium-containing transition metal oxide, in terms of its high average discharge voltage and cost advantage.

Examples of the transition metal element contained in the lithium-containing transition metal oxide include Sc, Ti, V, Cr, Mn, Fe, Co, Ni, Cu, Y, Zr, and W. The lithium-containing transition metal oxide may contain one kind or two or more kinds of transition metal elements. The transition metal element may be at least one selected from the group consisting of Co, Ni, and Mn. The lithium-containing transition metal oxide can contain one kind or more kinds of typical metal elements, as needed. Examples of the typical metal element include Mg, Al, Ca, Zn, Ga, Ge, Sn, Sb, Pb, and Bi. The typical metal element may be Al or the like.

The positive electrode can be obtained by, for example, applying or packing a slurry containing constituent components of the positive electrode mixture layer and a dispersion medium onto or into a positive electrode current collector, and drying and compressing the applied or packed film. A conductive carbonaceous material may be applied, as needed, onto a surface of the positive electrode current collector. As the dispersion medium, at least one selected from the group consisting of water and an organic medium can be used.

(Separator)

For the separator, a porous sheet having ion permeability and electrically insulating properties is used. The porous sheet includes, for example, a microporous film, a woven fabric, and a non-woven fabric. The material of the separator may be a polymer material. The polymer material is exemplified by an olefin resin, a polyamide resin, and a cellulose. Examples of the olefin resin include polyethylene, polypropylene, and a copolymer of ethylene and propylene. The separator may contain an additive, as needed. Examples of the additive include an inorganic filler.

The separator may include multiple layers that differ in at least one of morphology and composition. Such a separator may be, for example, a laminate of a polyethylene microporous film and a polypropylene microporous film, or a laminate of a non-woven fabric containing cellulose fibers and a non-woven fabric containing thermoplastic resin fibers.

(Non-Aqueous Electrolyte)

The non-aqueous electrolyte includes, for example, a non-aqueous solvent, ions to serve as charge carriers, and as needed, counter ions against the above ions. For example, in the non-aqueous electrolyte secondary battery, when ions to serve as charge carriers are lithium ions, the non-aqueous electrolyte has lithium ion conductivity. The non-aqueous electrolyte having lithium ion conductivity includes, for example, a non-aqueous solvent, and lithium ions and anions dissolved in the non-aqueous solvent. The non-aqueous electrolyte may be in the form of liquid of gel.

The non-aqueous electrolyte in the form of liquid is prepared, for example, by dissolving a lithium salt in a non-aqueous solvent. When the lithium salt is dissolved in the non-aqueous solvent, lithium ions and anions are produced. As the lithium salt, a salt of lithium ions and anions is used.

The non-aqueous electrolyte in the form of gel include, for example, a liquid non-aqueous electrolyte and a matrix polymer. The matrix polymer is, for example, a polymer material to be gelled by absorbing a non-aqueous solvent. As the polymer material, at least one selected from the group consisting of a fluorocarbon resin, an acrylic resin, and a polyether resin can be used.

As the lithium salt or anions, any known component utilized for non-aqueous electrolyte in a lithium secondary battery can be used. Examples of the anions include $BF_4^-$, $ClO_4^-$, $PF_6^-$, $CF_3SO_3^-$, $CF_3CO_2^-$, anions of an imide compound, and anions of an oxalate compound. The anions of an imide compound may be $N(SO_2C_mF_{2m+1})(SO_2C_nF_{2n+1})^-$, where m and n is each independently an integer of 0 or greater. The m and n each independently may be 0 to 3, and may be 0, 1 or 2. Examples of the anions of an imide compound include $N(SO_2CF_3)_2^-$, $N(SO_2C_2F_5)_2^-$, and $N(SO_2F)_2^-$. The anions of an oxalate compound may contain boron and/or phosphorus. The anions of an oxalate compound may be anions of an oxalate complex. Examples of the anions of an oxalate compound include bisoxalate borate anion, $BF_2(C_2O_4)^-$, $PF_4(C_2O_4)^-$, and $PF_2(C_2O_4)_2^-$. The non-aqueous electrolyte may contain one kind or two or more kinds of these anions.

Examples of the non-aqueous solvent include esters, ethers, nitriles, amides, and halogen substituted derivatives of these. The non-aqueous electrolyte may contain one kind or two or more kinds of these non-aqueous solvents. The halogen substituted derivatives include, for example, a fluoride.

The esters include, for example, a carbonic acid ester, and a carboxylic acid ester. Examples of a cyclic carbonic acid ester include ethylene carbonate, propylene carbonate, and fluoroethylene carbonate. Examples of a chain carbonic acid ester include dimethyl carbonate, ethyl methyl carbonate, and diethyl carbonate. Examples of a cyclic carboxylic acid ester include γ-butyrolactone and γ-valerolactone. Examples of a chain carboxylic acid ester include ethyl acetate, methyl propionate, and methyl fluoropropionate.

The ethers include, for example, a cyclic ether, and a chain ether. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

The nitriles include, for example, acetonitrile, propionitrile, and benzonitrile. The amides include, for example, dimethylformamide and dimethylacetamide.

The concentration of the lithium salt in the non-aqueous electrolyte is, for example, 0.5 mol/L or more and 3.5 mol/L or less. Here, the concentration of the lithium salt is the sum of the concentrations of a dissociated lithium salt and an undissociated lithium salt. The concentration of the anions in the non-aqueous electrolyte may be set to 0.5 mol/L or more and 3.5 mol/L or less.

The non-aqueous electrolyte may contain an additive. Examples of the additive include vinylene carbonate, fluoroethylene carbonate, and vinylethylene carbonate. The additive may be used singly or in combination of two or more kinds.

(Others)

The non-aqueous electrolyte secondary battery is fabricated by, for example, housing an electrode group and a non-aqueous electrolyte in a battery case. The electrode group is formed by, for example, winding a positive electrode and a negative electrode with a separator interposed between the positive electrode and the negative electrode. The shape of the end surface of the wound electrode group in the winding axis direction may be circular, elliptical, or oval. As for the configuration other than the electrode group and the non-aqueous electrolyte of the non-aqueous electrolyte secondary battery, any known configurations can be used without any particular limitation.

Figure 2:
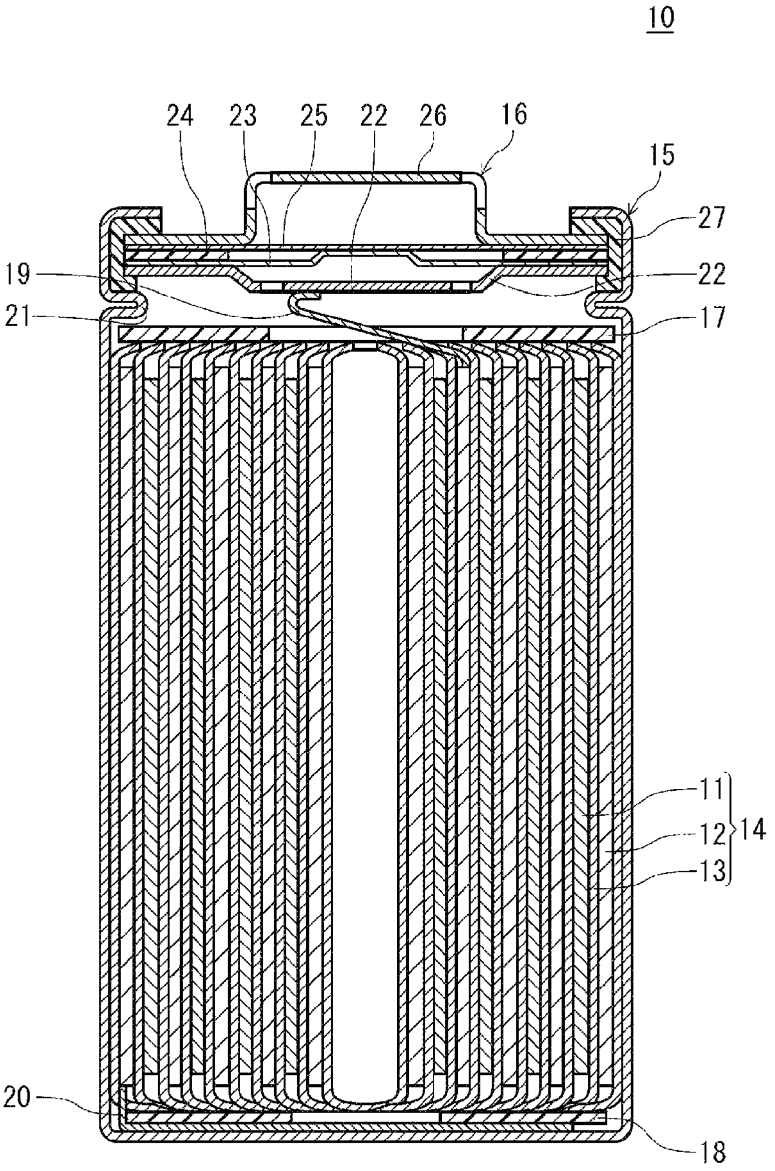
FIG. 2 A schematic longitudinal cross-sectional view of a non-aqueous electrolyte secondary battery according to one embodiment of the present disclosure.

FIG. 2 is a schematic longitudinal cross-sectional view of a non-aqueous electrolyte secondary battery according to one embodiment of the present disclosure.

A non-aqueous electrolyte secondary battery 10 is a cylindrical battery including a cylindrical battery case, a wound electrode group 14 housed in the battery case, and a non-aqueous electrolyte (not shown). The battery case is constituted of a case main body 15 which is a bottomed cylindrical metal container, and a sealing member 16 sealing the opening of the case main body 15. A gasket 27 is disposed between the case main body 15 and the sealing member 16, by which the airtightness of the battery case is ensured. In the case main body 15, insulating plates 17 and 18 are disposed respectively at both ends in the winding axis direction of the electrode group 14.

The case main body 15 has a step portion 21 formed by, for example, partially pressing the sidewall of the case main body 15 from outside. The step portion 21 may be annularly formed on the sidewall of the case main body 15 along the circumferential direction of the case main body 15. In this case, the sealing member 16 is supported by the surface of the step portion 21 on the opening side.

The sealing body 16 has a filter 22, a lower valve body 23, an insulating member 24, an upper valve body 25, and a cap 26. In the sealing member 16, these members are laminated together in this order. The sealing member 16 is attached at the opening of the case main body 15, such that the cap 26 is positioned outside the case main body 15, while the filter 22 is positioned inside the case main body 15. Each of the above members constituting the sealing member 16 is, for example, disk-shaped or ring-shaped. The members except the insulating member 24 are electrically connected to each other.

The electrode group 14 has a positive electrode 11, a negative electrode 12, and a separator 13. The positive electrode 11, the negative electrode 12, and the separator 13 all have a belt-like shape. The negative electrode 12 includes, for example, a negative electrode current collector 112 as shown in FIG. 1. The positive electrode 11 and the negative electrode 12 are spirally wound with the separator 13 interposed therebetween, such that the width directions of the belt-like positive and negative electrodes 11 and 12 are in parallel with the winding direction. In a cross section perpendicular to the winding axis of the electrode group 14, the positive electrode 11 and the negative electrode 12 are alternately stacked in the radial direction of the electrode group 14, with the separator 13 interposed between these electrodes.

The positive electrode 11 is electrically connected, via a positive electrode lead 19, to a cap 26 also serving as a positive electrode terminal. One end of the positive electrode lead 19 is connected to the positive electrode 11, for example, approximately at its center of in the longitudinal direction. The positive electrode lead 19 extending from the positive electrode 11 passes through a through-hole (not shown) formed in the insulating plate 17 and extends to the filter 22. The other end of the positive electrode lead 19 is welded to the surface of the filter 22 on the electrode group 14 side.

The negative electrode 12 is electrically connected, via a negative electrode lead 20, to the case main body 15 also serving as a negative electrode terminal. One end of the negative electrode lead 20 is connected to, for example, an end portion of the negative electrode 12 in the longitudinal direction, and the other end is welded to the inner bottom surface of the case main body 15.

EXAMPLES

The non-aqueous electrolyte secondary battery of the present disclosure will be specifically described below with reference to Examples and Comparative Examples. It is to be noted, however, that the present invention is not limited to the following Examples.

Examples 1 to 7 and Comparative Examples 1 to 2

Cylindrical lithium secondary batteries were fabricated by the following procedure.

(1) Production of Positive Electrode

A positive electrode active material, acetylene black serving as a conductive material, and polyvinylidene fluoride serving as a binder were mixed in a mass ratio of 95:2.5:2.5. To the mixture, an appropriate amount of N-methyl-2-pyrrolidone serving as a dispersion medium was added and stirred, to prepare a positive electrode slurry. The positive electrode active material used here was a lithium-containing transition metal oxide containing Ni, Co and Al.

The positive electrode slurry was applied onto both surfaces of an aluminum foil serving as a positive electrode current collector, and dried. The dried product was compressed in its thickness direction using a roller. The resultant stack was cut in a predetermined electrode size, to form a positive electrode having a positive electrode mixture layer on both surfaces of the positive electrode current collector. Here, in a partial region of the positive electrode, a positive electrode current collector-exposed portion that does not have the positive electrode mixture layer was formed. To the positive electrode current collector-exposed portion, a positive electrode lead made of aluminum was attached at its one end, by means of welding.

(2) Preparation of Non-Aqueous Electrolyte

A non-aqueous electrolyte was prepared by dissolving lithium hexafluorophosphate ($LiPF_6$), and further dissolving lithium difluorooxalate borate (LiFOB), in a non-aqueous solvent mixture containing propylene carbonate and 1,2-dimethoxyethane in a volume ratio of 1:2. The concentrations of $LiPF_6$ and LiFOB in the non-aqueous electrolyte were 1 mol/L and 100 mmol/L, respectively.

(3) Fabrication of Battery

To a negative electrode current collector, a negative electrode lead made of nickel was attached at its end, by means of welding. In an inert gas atmosphere, the negative electrode current collector and the positive electrode were spirally wound with a polyethylene separator (microporous film) interposed therebetween, to form an electrode group. All the lithium contained in the electrode group is derived from the positive electrode, and therefore, a molar ratio yLi/yM of a total amount yLi of the lithium that the positive electrode and the negative electrode has, to an amount yM of the metal M (here, Ni, Co and Al) that the positive electrode has, is 1.0.

The negative electrode current collector was prepared by forming a group of slits by laser processing in a copper foil (thickness: 10 μm) having a belt-like shape. In the negative electrode current collector, a plurality of slit groups extending in parallel with each other in the short-side direction from one end of the first and second ends toward the other end were formed. More specifically, in the negative electrode current collector, a first slit group extending in parallel with the short-side direction from the first end toward the second end, and a second slit group extending in parallel with the short-side direction from the second end toward the first end were alternately formed. In each slit group in the negative electrode current collector used in Examples, as shown in FIG. 1, a hole having a circular shape was formed so as to be continuous with the slit on the other end side of a plurality of slits constituting each slit group. The width of the circular hole (in other words, the diameter of the circle) was set as shown in Table 1. In the negative electrode current collector used in Comparative Examples, the slit groups were each constituted only of a plurality of slits, and the hole was not formed. The length and width of the slits, the interval between adjacent slits, and the average interval between adjacent slit groups in the negative electrode current collectors used in Examples and Comparative Examples are shown in Table 1. In the negative electrode current collectors used in Example 7 and Comparative Example 2, as shown in FIG. 1, the average interval Po between adjacent slit groups in a portion of L/4 from the end on the outer layer side was set smaller than the average interval Pi between adjacent slit groups in the remaining portion. The slit groups were each formed at a position of 2 W/3 from the first or second end.

The electrode group was housed in a pouch-like outer body formed of a laminate sheet having an Al layer, and after injecting a non-aqueous electrolyte thereinto, the outer body was sealed, to complete a lithium secondary battery. When housing the electrode group in the outer body, the other end of the positive electrode lead and the other end of the negative electrode lead were exposed externally from the outer body.

The thickness of the negative electrode after initial discharge obtained by the already-described procedure corresponded to the thickness of the copper foil and was 10 μm. Moreover, at full charge, lithium was deposited on both principal surfaces of the copper foil in a thickness of about 10 μm, and the thickness of the negative electrode was about 30 μm. The thickness of the negative electrode at full charge obtained by the already-described procedure was about three times as large as the thickness of the negative electrode after initial discharge. In the lithium secondary battery, unlike when a negative electrode active material layer containing graphite and the like is formed on the negative electrode, the negative electrode after initial discharge barely contains a negative electrode active material. Therefore, in the lithium secondary battery, the ratio of the thickness of the negative electrode at full charge to the thickness of the negative electrode after initial discharge is much larger than that when the negative electrode includes a negative electrode active material layer containing graphite and the like.

(4) Evaluation

The following evaluation was performed using the fabricated lithium secondary batteries.

(a) Cycle Characteristics

In a 25° C. constant temperature bath, the lithium secondary batteries were each charged under the following charging conditions, and after a rest for 20 minutes, discharged under the following discharging conditions. With these charge, rest, and discharge taken as one cycle, a charge-discharge test of 10 cycles was performed. The ratio of the discharge capacity at the 10th cycle to the discharge capacity at the 1st cycle was determined as a capacity retention rate. The cycle characteristics of each lithium secondary battery were evaluated by a relative ratio (%), with the capacity retention rate of the lithium secondary battery of Comparative Example 1 taken as 100.

(Charge)

A constant-current charge was performed at a current of 10 mA per unit area of the electrode (unit: square centimeter) until the battery voltage reached 4.3 V, and then, a constant voltage-charge was performed at a voltage of 4.3 V until the current value per unit area of the electrode (unit: square centimeter) reached 1 mA.

(Discharge)

A constant-current discharge was performed at a current of 10 mA per unit area (unit: square centimeter) of the electrode until the battery voltage reached 2.5 V.

(b) Rupture of Negative Electrode Current Collector

After the cycle test, the lithium secondary battery was disassembled, to take out the negative electrode therefrom, and the state of rupture of the negative electrode current collector was visually observed, and evaluated by the following criteria.

A: The negative electrode current collector had ruptured along the slit groups, and no rupture was observed in the portion other than the slit groups.

B: In the negative electrode current collector, a rupture was observed not only in the portion of the slit groups but also in the portion other than the slit groups.

The evaluation results are shown in Table 1. E1 to E7 correspond to Examples, and C1 and C2 correspond to Comparative Examples.

TABLE 1

| | Length of slits (mm) | Width of slits (mm) | Interval between slits (mm) | Width of hole (mm) | Interval Po between slit groups (mm) | Interval Pi between slit groups (mm) | Cycle characteristics (%) | Rupture of negative electrode current collector |
|---|---|---|---|---|---|---|---|---|
| E1 | 1 | 0.02 | 2.5 | 1 | 2 | 2 | 125 | A |
| E2 | 1 | 0.02 | 1 | 1 | 2 | 2 | 138 | A |
| E3 | 1 | 0.02 | 1 | 0.2 | 2 | 2 | 136 | A |
| E4 | 0.5 | 0.02 | 1 | 1 | 2 | 2 | 138 | A |
| E5 | 1 | 0.02 | 0.5 | 1 | 2 | 2 | 140 | A |

TABLE 1-continued

| | Length of slits (mm) | Width of slits (mm) | Interval between slits (mm) | Width of hole (mm) | Interval Po between slit groups (mm) | Interval Pi between slit groups (mm) | Cycle characteristics (%) | Rupture of negative electrode current collector |
|---|---|---|---|---|---|---|---|---|
| E6 | 1 | 0.02 | 0.2 | 1 | 2 | 2 | 144 | A |
| E7 | 1 | 0.02 | 0.2 | 1 | 0.5 | 2 | 146 | A |
| C1 | 1 | 0.02 | 0.5 | — | 2 | 2 | 100 | B |
| C2 | 1 | 0.02 | 0.2 | — | 0.5 | 2 | 106 | B |

Table 1 shows that, in Comparative Examples using a negative electrode current collector having slit groups each constituted only of a plurality of slits, the negative electrode current collector ruptured not only in the portion of the slit groups but also in the portion other than the slit groups, and the cycle characteristics were also reduced. On the other hand, in Examples, the negative electrode current collector was prevented from rupturing in the portion other than the slit groups, and excellent cycle characteristics were achieved. This is presumably because, in Examples, as the negative electrode expands during charge, the negative electrode current collector ruptured along the slit groups, and the stress applied to the negative electrode current collector was relaxed by the hole, so that the rupture stops at the portion of the hole.

Furthermore, when the average interval Po between adjacent slit groups in the portion of L/4 from the end on the outer layer side of the negative electrode current collector is set smaller than the average interval Pi between adjacent slit groups in the remaining portion, the cycle characteristics can be further improved.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

In the non-aqueous electrolyte secondary battery according to the present disclosure, excellent cycle characteristics can be achieved even when the expansion and contraction of the negative electrode associated with charge and discharge are severe. Also, the capacity of the non-aqueous electrolyte secondary battery can be increased. Therefore, the non-aqueous electrolyte secondary battery according to the present disclosure is applicable to various uses for which excellent cycle characteristics or high capacity are required. Such uses include various electronic devices (e.g., mobile phones, smartphones, tablet terminals, wearable terminals), electric cars including hybrids and plug-in hybrids, and household storage batteries combined with solar cells. The uses of the non-aqueous electrolyte secondary battery, however, are not limited thereto.

REFERENCE SIGNS LIST

112 negative electrode current collector
113 slit group
113*a* a plurality of slits
113*b* hole
1131 first slit group
1132 second slit group
$D_S$ short-side direction of negative electrode current collector
e1 first end in short-side direction of negative electrode current collector
e2 second end in short-side direction of negative electrode current collector
$D_L$ long-side direction of negative electrode current collector
Eo end on outer layer side of winding of negative electrode current collector
Ei end on inner layer side of winding of negative electrode current collector
L length in long-side direction of negative electrode current collector
W length in short-side direction of negative electrode current collector
p1, p2 interval between adjacent slit groups
10 non-aqueous electrolyte secondary battery
11 positive electrode
12 negative electrodes
13 separator
14 electrode group
15 case main body
16 sealing member
17, 18 insulating plate
19 positive electrode lead
20 negative electrode lead
21 step portion
22 filter
23 lower valve body
24 insulating member
25 upper valve body
26 cap
27 gasket
30 positive electrode current collector
31 positive electrode mixture layer

The invention claimed is:

1. A non-aqueous electrolyte secondary battery, comprising:
a wound electrode assembly; and a non-aqueous electrolyte, wherein
the wound electrode assembly and the non-aqueous electrolyte are housed in a battery case,
the wound electrode assembly includes a positive electrode, a negative electrode, and a separator, the separator spirally wound about a winding axis together with and interposed between the positive electrode and the negative electrode,
the negative electrode includes a negative electrode current collector having:
a belt-like wound-planar shape, opposite-facing parallel first and second planar sides having a width and a length and defining a thickness of the negative electrode current collector, a perimeter of the first and second planar sides defined by first and second short edges and first and second long edges, the first and second short sides defining the width, and the first and second long sides defining the length of the negative electrode current collector, and having a first collector end at the first short edge and a second collector end at the second short edge, and the negative electrode current collector includes at least one slit group having:

a plurality of slits, and a hole having a width larger than an average width of the plurality of slits, the slit group extending along a linear path from the first long edge toward the second long edge or from the second long edge toward the first long edge, the linear path extending from a proximal end at the first or second long edge to a distal end at the hole the plurality of slits spaced along the linear path and terminating at the hole, and each slit of the plurality of slits and the hole having a depth extending through the collector from the first planar side to the second planar side, the depth corresponding to the thickness of the collector.

2. The non-aqueous electrolyte secondary battery according to claim 1, wherein the hole is continuous with a terminal slit of the plurality of slits at the distal end.

3. The non-aqueous electrolyte secondary battery according to claim 1, wherein:

the negative electrode further includes a negative electrode active material, the negative electrode is configured to have a total thickness, inclusive of the collector and active material, at full charge of T1 and after initial discharge of T0, and a ratio T1/T0 is 1.18 or more.

4. The non-aqueous electrolyte secondary battery according to claim 1, wherein the first long edge, or the second long edge, or both is cut by a respective slit on the proximal end of the linear path.

5. The non-aqueous electrolyte secondary battery according to claim 1, wherein the slit group is a first slit group and the battery further comprises a second slit group, the first slit group extending along a linear path from the first long edge toward the second long edge and the second slit group extending from the second long edge toward the first long edge.

6. The non-aqueous electrolyte secondary battery according to claim 5, wherein when the width of the negative electrode current collector is denoted by W, a first distance between the hole of the first slit group and the second long edge is, or a second distance between the hole of second slit group and the first long edge is, or both the first and second distances are 0.1 W or more and 0.5 W or less.

7. The non-aqueous electrolyte secondary battery according to claim 5, comprising:

a first set of two or more first slit groups spaced along the first long edge, or a second set of two or more second slit groups spaced along the second long edge, or both the first and second sets.

8. The non-aqueous electrolyte secondary battery according to claim 7, wherein the first slit groups of the first set and the second slit groups of the second set are alternately arranged along the length of the collector.

9. The non-aqueous electrolyte secondary battery according to claim 7, wherein when the length of the negative electrode current collector is denoted by L, an average interval along the length between adjacent slit groups of the first set, or between adjacent slit groups of the second set, or between adjacent slit groups of the combined first and second sets in a first portion of L/4 extending along the length from the first collector end is smaller than an average interval between adjacent slit groups in a second portion of 3L/4 extending from the first portion to the second collector end, the first planar side in the first portion facing and closer to the battery case than the first planar side in the second portion.

10. The non-aqueous electrolyte secondary battery according to claim 1, wherein an average interval between adjacent slits of the plurality of slits along the linear path is 0.02 mm or more and 3 mm or less.

11. The non-aqueous electrolyte secondary battery according to claim 1, wherein the width of the hole is 0.05 mm or more and 2 mm or less.

12. The non-aqueous electrolyte secondary battery according to claim 1, wherein the hole is circular or oval in shape.

13. The non-aqueous electrolyte secondary battery according to claim 1, being a lithium secondary battery, the negative electrode current collector is configured for deposition of a lithium metal on a surface of the negative electrode current collector during charge, and dissolution of the lithium metal during discharge.

14. The non-aqueous electrolyte secondary battery according to claim 1, where the battery case is cylindrical.

15. The non-aqueous electrolyte secondary battery according to claim 14, wherein a cross-sectional shape of the battery case along a plane perpendicular to the winding axis is circular, elliptical, or oval.

* * * * *